Figure 1:
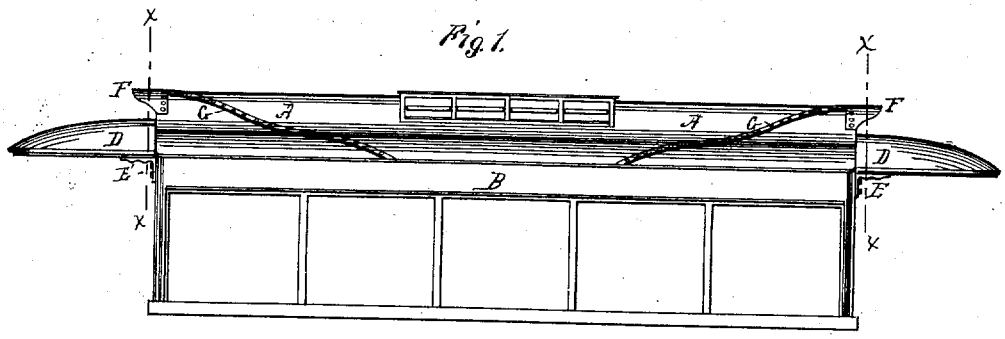

J. STEPHENSON.

Street-Car.

No. 6,696. Reissued Oct. 11, 1875.

Witnesses.
L. Van Risorick
A. G. Stuart

Inventor.
John Stephenson
per P. Hannay
atty.

THE NORRIS PETERS CO., PHOTO-LITHO., WASHINGTON, D. C.

UNITED STATES PATENT OFFICE.

JOHN STEPHENSON, OF NEW YORK, N. Y.

IMPROVEMENT IN STREET-CARS.

Specification forming part of Letters Patent No. 61,482, dated January 22, 1867; reissue No. 6,696, dated October 11, 1875; application filed July 23, 1875.

DIVISION E[1].

*To all whom it may concern:*

Be it known that I, JOHN STEPHENSON, of New York, in the county of New York and State of New York, have invented certain new and useful Improvements in Roofs for Street-Cars; and I do hereby declare that the following is a full, clear, and exact description thereof, that will enable others skilled in the art to which it appertains to make and use the same, reference being had to the accompanying drawings, which form a part of this specification.

This division of my invention relates to certain new and useful improvements in the construction of the roofs of street-cars, which have for their object greater lightness, elegance, durability, economy in shipments, and facility for repairs.

In the ordinary mode of constructing the roofs of street-cars the top rails and other roof-timbers are prolonged beyond the ends of the body sufficiently far to form a permanent cover for the platforms also. This renders them cumbersome, bulky, and heavy, as well as awkward and inconvenient to handle in the shop or factory during the process of construction or repairs, and, moreover, they require great space during these processes. Again, in forwarding cars by rail, it is economy to put several on a single "flat car." This, however, cannot be done with cars provided with the long roof, nor can such cars be conveniently shipped by vessels to distant parts, as the ordinary hatches and space below deck are insufficient to allow such bulky commodities to be conveniently handled or snugly and compactly stowed away.

All these difficulties and troubles I remedy, first, by constructing the roof of the car of the same length as the body; and, secondly, in making the end roofs, canopies, or bonnets which cover or protect the platforms detachable or independent appliances.

This construction, in shipping, enables the package to be confined to the length of the car-body, thereby bringing its dimensions within the convenience of commerce, and otherwise, from its reduced size and weight, rendering it more easy to handle.

Again, it will be apparent that the higher the roof is erected above the platforms the farther they must extend beyond the ends of the car, in order to protect the driver, conductor, and passengers from the inclemency of the weather or fervid heat of the sun, and vice versa; in view of which, instead of arranging my detachable and independent bonnet or hood in the same plane as the higher portion of the roof, I locate it at a point considerably below the ridged or dome-shaped part, which not only enables me to greatly lessen the size and weight of the canopies, but gives a much more elegant form or contour to the whole car than where the ridge of the roof and platform canopies or covers form a continuous and unbroken line.

Again, as those parts of the roof of street-cars which project over the platforms are most subject to breakage, and inasmuch as the top rails—which, as ordinarily constructed, project beyond the corner pillars of the car—are apt to decay and be broken at the point of departure from said pillars, it will be evident that such difficulties are effectually avoided by the use of my detachable canopies or bonnets as the "covers" for the platforms, which, if injured, can be readily repaired, and renewed, if decayed.

Moreover, such canopies admit of being made lighter, and yet be actually stronger, than when made in the old way, as each may be made of bent timbers, which will also render them more flexible and yielding. The use of bent timbers also enables a more suitable form to be given to them to avoid collision, and makes them much more durable.

This construction of the roof and the arrangement of the canopies in a lower plane than the latter afford an opportunity for providing the ends of the cars between the canopies and the roof proper with openings for ventilating and illuminating purposes. But, the end of the roof of the car being thus limited to the length of the body exposes these openings to sun and storm, to prevent which I extend those portions of the roof immediately over the openings for a short distance, so as to form a shelter or shield to them, and which, for convenience of shipment and repairs, is also made detachable.

This invention also relates to a method of strengthening the upper portion of the car-body, which is found to be very desirable, owing to the fact that the lightness of construction of the walls of the car-body renders the roof of the car, because of its weight, very liable to settle in the middle, thereby forcing the feet of the rafters against the sides of the cars, thrusting them outward, and thus letting the heads of the rafters settle together with the roof structure. This I obviate or remedy by anchoring the sides of the car to the head of the end top rails by means of metallic straps or other equivalent device. These straps are secured at their ends so as to hold the top rails of the sides of the car to the top rails of its end when each have been properly and relatively adjusted with respect to each other. In practice, I prefer to locate them on the roof-boards, immediately under the roof-canvas.

To enable others skilled in the art to make, construct, and use my invention, I will now proceed to describe it in detail, omitting a particular description of such parts of a street-car as is unnecessary to a full understanding of the present improvements.

Figure 4:
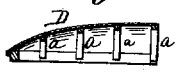
Figure 3:
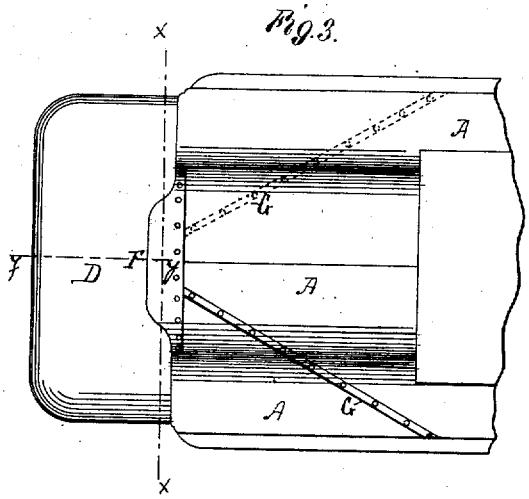
Figure 2:
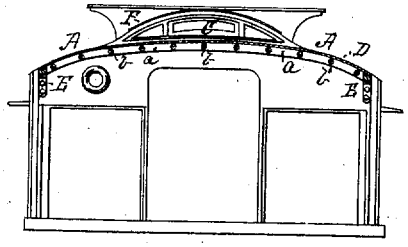

In the accompanying drawings, Figure 1 represents a side elevation of the upper portion of a street-car to which my improvement has been applied. Fig. 2 represents a vertical transverse section of the same as taken through the lines *x x* of Figs. 1 and 3, looking toward the body of the car. Fig. 3 represents a plan or top view of Fig. 1. Fig. 4 represents a vertical section of the canopy detached, taken in the line *y y* of Fig. 3.

Each letter of reference on the drawing indicates the same part in the different figures.

A represents a portion of the roof of a car constructed on my improved plan—that is to say, it is made of the same general length as the car-body, so as to terminate at both ends of the latter, it only overlapping slightly. This roof may be constructed in any of the known ways or forms. I, however, prefer to make it with sufficient rise or arch in the middle to admit of the use of openings at each end of the car. Each of these openings may be provided with ventilators or windows C, capable of being opened or closed at will. These openings are shown in Fig. 2. Immediately below the window or ventilating openings C is arranged a removable canopy or bonnet, D, which is so constructed as to extend over and protect the platform below from the sun or inclemency of the weather. Each canopy is made a separate and independent piece from the roof, and may have its rails *a* made of bent wood running crosswise of the car, thereby enabling it to be made much lighter than if formed by a continuation of the roof-timbers, as heretofore. Each of the canopies may be secured to the end of the car by means of screws or screw-bolts and nuts, which for this purpose may be passed through the innermost rail *a* of the canopy into or through the end of the car. As a further support, two metal brackets, E, are bolted to the end of the car and to the canopy, there being one on each side of the latter, at its junction with the car. By this construction of the canopy, and mode of applying it to the car, it will be apparent that it can, whenever desired, be readily detached from or applied to the latter, whether for repairs or renewal, or to facilitate shipment. Immediately above the openings C at each end of the car is arranged a small frontlet or hood, F, as a protection to the former from the sun or inclemency of the weather. Frontlet F, like canopy D, should be made removable, so as to be readily detached for shipping or other purposes. To this end I make it of sheet metal or other suitable material, and then screw or bolt it to the roof in a manner similar to that shown in Fig. 3, it being made of a shape conformable to the outer contour of the roof to which it is applied.

In Fig. 1 are represented two pairs of binding straps or bars, G, of metal or wood, each pair being so arranged as to run in opposite directions diagonally across the ends of the roof A, from the top rails of the two sides B B toward the middle of and to the top rails of the ends of the car. These straps I prefer to arrange on the outside of the roof, immediately beneath the canvas cover. Each pair is respectively secured at one end to the top rail of one end, and at the other to the top rails of their respective sides of the car, they being bolted or screwed to the roof at suitable intervals throughout their entire length, for which purpose they are so bent or otherwise formed as to conform to the outer contour of the roof in their courses.

These diagonally-arranged straps greatly strengthen the car and effectually prevent the sagging or settling of the roof, or the forcing outward of the sides of the car by the lateral thrust of the rafters under the weight or pressure of the roof.

Having described my invention, what I claim as new, and desire to secure by Letters Patent, is—

1. A street-car in which the body and roof are made of the same, or, for all practical purposes, of nearly the same, length, substantially as and for the purposes set forth.

2. An independent canopy, D, for covering or protecting the platforms of cars, it being so constructed as that it may be attached to or detached from the body of the car, substantially as and for the purposes set forth.

3. In combination with a car-body having a roof of the same, or about the same, general length as itself, an independent canopy, D, capable of being attached thereto or detached therefrom, for the purposes substantially as set forth.

4. In combination with a car-body having a roof of about the same general length as itself, a canopy or bonnet to cover or protect the platform, arranged in a plane lower than the central portion of the roof A which covers the car-body, substantially as and for the purposes set forth.

5. A frontlet or canopy, F, at the end of a car-roof, whose general length is the same as the car-body, for the purposes set forth.

6. A detachable frontlet or canopy, F, arranged above the ventilating-opening G, in combination with the roof of a street-car whose general length is the same as the car-body, for the purposes set forth.

In testimony that I claim the foregoing I have hereunto set my hand this 2d day of July, 1875.

JOHN STEPHENSON.

Witnesses:

STUART A. STEPHENSON,

WM. J. WALKER.